US012262280B2

(12) United States Patent
Nagori et al.

(10) Patent No.: US 12,262,280 B2
(45) Date of Patent: Mar. 25, 2025

(54) VALIDATING AND USING MAP DATA FOR POSITIONING

(71) Applicant: QUALCOMM Incorporated, San Diego, CA (US)

(72) Inventors: Neha Nagori, San Jose, CA (US); Han Zhang, Beijing (CN); Himanshu Shah, Milpitas, CA (US); Abdelmonaem Lakhzouri, Fremont, CA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/391,988

(22) Filed: Aug. 2, 2021

(65) Prior Publication Data

US 2022/0046383 A1    Feb. 10, 2022

Related U.S. Application Data

(60) Provisional application No. 63/060,948, filed on Aug. 4, 2020.

(51) Int. Cl.
*H04W 4/02* (2018.01)
*H04W 4/029* (2018.01)

(52) U.S. Cl.
CPC ........... *H04W 4/027* (2013.01); *H04W 4/029* (2018.02)

(58) Field of Classification Search
CPC ..... H04W 4/027; H04W 4/029; H04W 4/025; G01S 5/0269
See application file for complete search history.

(56) References Cited

U.S. PATENT DOCUMENTS

| | | | |
|---|---|---|---|
| 2015/0119076 A1 | 4/2015 | Cohen | |
| 2017/0064515 A1* | 3/2017 | Heikkila | ............. G01S 5/02522 |
| 2017/0074965 A1* | 3/2017 | Lee | ........................ H04W 4/023 |
| 2017/0293303 A1* | 10/2017 | Medagoda | ........... A01B 69/008 |

FOREIGN PATENT DOCUMENTS

EP     3342192 B1    5/2020

OTHER PUBLICATIONS

International Search Report and Written Opinion—PCT/US2021/044248—ISA/EPO—May 25, 2022.

(Continued)

*Primary Examiner* — Umair Ahsan
(74) *Attorney, Agent, or Firm* — QUALCOMM Incorporated

(57) ABSTRACT

A method being for facilitating positioning determination of a UE includes: obtaining motion information indicative of motion of the UE; obtaining positioning information based on positioning signals received by the UE; determining a validity status of map data based on whether the positioning information, the motion of the UE, and the map data, that include locations of physical environmental features, are consistent, wherein the validity status is determined to be valid in response to the positioning information, the motion of the UE, and the map data being consistent; and determining at least one of a position estimate for the UE, or a direction of motion of the UE, based on the map data and based on the validity status being valid.

36 Claims, 9 Drawing Sheets

(56) References Cited

OTHER PUBLICATIONS

Lee Y-C., et al., "Urban Localization Method for Mobile Robots Based on Dead Reckoning Sensors, GPS, and Map Matching", Systems, Man, and Cybernetics (SMC), 2011 IEEE International Conference on, IEEE, Oct. 9, 2011 (Oct. 9, 2011), pp. 2363-2368, XP031999846, DOI: 10.1109/ICSMC.2011.6084031 ISBN: 978-1-4577-0652-3, the whole document.
Oguz-Ekim P., et al., "Proof of Concept Study Using DSRC, IMU and Map Fusion for Vehicle Localization in GNSS-Denied Environments", 2016 IEEE 19th International Conference on Intelligent Transportation Systems (ITSC), IEEE, Nov. 1, 2016 (Nov. 1, 2016), pp. 841-846, XP033028439, DOI: 10.1109/ITSC.2016.7795653, figure 1, p. 842, section A, p. 843, section C, p. 844, last three full paragraphs of section III, table 1.
Partial International Search Report—PCT/US2021/044248—ISA/EPO—Dec. 13, 2021.

\* cited by examiner

VALIDATING AND USING MAP DATA FOR POSITIONING

CROSS-REFERENCE TO RELATED APPLICATIONS

This application claims the benefit of U.S. Provisional Application No. 63/060,948, filed Aug. 4, 2020, entitled "VALIDATING AND USING MAP DATA FOR POSITIONING," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment (UE) includes: a receiver configured to receive positioning signals; a sensor configured to provide sensor output data indicative of motion of the UE; a memory; and a processor communicatively coupled to the receiver, the sensor, and the memory, where the processor is configured to: obtain positioning information based on the positioning signals; determine a validity status of map data based on whether the positioning information, the motion of the UE, and the map data, that include locations of physical environmental features, are consistent, where the processor is configured to determine the validity status as valid in response the positioning information, the motion of the UE, and the map data being consistent; and determine at least one of a position estimate for the UE, or a direction of motion of the UE, based on the map data and based on the validity status being valid.

Implementations of such a UE may include one or more of the following features. The processor is configured to constrain at least one of the position estimate for the UE, or the direction of motion of the UE, based on the map data and based on the validity status being valid. The processor is configured to determine, based on the map data, based on the validity status being valid, and based on one or more first respective positioning signal measurements, a first portion of positioning information to use to determine the at least one of the position estimate for the UE or the direction of motion of the UE. The first portion of positioning information includes at least one of a pseudorange or a Doppler measurement. To determine the at least one of the position estimate for the UE or the direction of motion of the UE the processor is configured to disregard a second portion of the positioning information, based on one or more second respective positioning signal measurements, that has a corresponding cross-track component above a threshold value.

Also or alternatively, implementations of such a UE may include one or more of the following features. The processor is configured to determine the at least one of the position estimate for the UE or the direction of motion of the UE based on the map data only if the validity status is presently valid. The processor is configured to change the validity status of the map data, from valid to invalid or from invalid to valid as appropriate, in response to determining that a consistency of the positioning information, the map data, and the motion of the UE changed. To determine whether the positioning information, the motion of the UE, and the map data are consistent the processor is configured to: determine a portion of the map data based on the positioning information; and determine whether the motion of the UE is consistent with a subset of the physical environmental features corresponding to the portion of the map data. To determine whether the motion of the UE is consistent with the subset of the physical environmental features corresponding to the portion of the map data the processor is configured to determine whether the motion of the UE is less than a threshold amount of motion in a particular direction, the threshold amount of motion being based on the physical environmental features corresponding to the portion of the map data. To determine whether the motion of the UE is consistent with the subset of the physical environmental features corresponding to the portion of the map data the processor is configured to determine whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

Another example UE includes: means for sensing motion of the UE and producing output data indicative of the motion of the UE; means for obtaining positioning information based on positioning signals received by the UE; validity status means for determining a validity status of map data based on whether the positioning information, the motion of the UE, and the map data, that include locations of physical environmental features, are consistent, wherein the validity status means are for determining the validity status as valid in response the positioning information, the motion of the UE, and the map data being consistent; and first determining means for determining at least one of a position estimate for the UE, or a direction of motion of the UE, based on the map data and based on the validity status being valid.

Implementations of such a UE may include one or more of the following features. The first determining means include means for constraining at least one of the position estimate for the UE, or the direction of motion of the UE, based on the map data and based on the validity status being valid. The first determining means include means for determining, based on the map data, based on the validity status being valid, and based on one or more first respective positioning signal measurements, a first portion of the positioning information to use to determine the at least one of the position estimate for the UE or the direction of motion of the UE. The first portion of the positioning information includes at least one of a pseudorange or a Doppler measurement. The first determining means include means for disregarding a second portion of the positioning information, based on one or more second respective positioning signal measurements, that has a corresponding cross-track component above a threshold value.

Also or alternatively, implementations of such a UE may include one or more of the following features. The first determining means include means for determining the at least one of the position estimate for the UE or the direction of motion of the UE based on the map data only if the validity status is presently valid. The validity status means include means for changing the validity status of the map data, from valid to invalid or from invalid to valid as appropriate, in response to determining that a consistency of the positioning information, the map data, and the motion of the UE changed. The validity status means include: second determining means for determining a portion of the map data based on the positioning information; and third determining means for determining whether the motion of the UE is consistent with a subset of the physical environmental features corresponding to the portion of the map data. The third determining means include means for determining whether the motion of the UE is less than a threshold amount of motion in a particular direction, the threshold amount of motion being based on the physical environmental features corresponding to the portion of the map data. The third determining means include means for determining whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

An example method, of determining position or motion, or both, of a UE includes: obtaining motion information indicative of motion of the UE; obtaining positioning information based on positioning signals received by the UE; determining a validity status of map data based on whether the positioning information, the motion of the UE, and the map data, that include locations of physical environmental features, are consistent, wherein the validity status is determined to be valid in response to the positioning information, the motion of the UE, and the map data being consistent; and determining at least one of a position estimate for the UE, or a direction of motion of the UE, based on the map data and based on the validity status being valid.

Implementations of such a method may include one or more of the following features. Determining the at least one of the position estimate for the UE, or the direction of motion of the UE, includes constraining at least one of the position estimate for the UE, or the direction of motion of the UE, based on the map data and based on the validity status being valid. The method includes determining, based on the map data, based on the validity status being valid, and based on one or more first respective positioning signal measurements, a first portion of the positioning information to use to determine the at least one of the position estimate for the UE or the direction of motion of the UE. The first portion of the positioning information includes at least one of a pseudorange or a Doppler measurement. Determining the at least one of the position estimate for the UE, or the direction of motion of the UE, includes disregarding a second portion of the positioning information, based on one or more second respective positioning signal measurements, that has a corresponding cross-track component above a threshold value.

Also or alternatively, implementations of such a method may include one or more of the following features. Determining the at least one of the position estimate for the UE, or the direction of motion of the UE, is based on the map data only if the validity status is presently valid. The method includes changing the validity status of the map data, from valid to invalid or from invalid to valid as appropriate, in response to determining that a consistency of the positioning information, the map data, and the motion of the UE changed. Determining whether the positioning information, the motion of the UE, and the map data are consistent includes: determining a portion of the map data based on the positioning information; and determining whether the motion of the UE is consistent with a subset of the physical environmental features corresponding to the portion of the map data. Determining whether the motion of the UE is consistent with the subset of the physical environmental features corresponding to the portion of the map data includes determining whether the motion of the UE is less than a threshold amount of motion in a particular direction, the threshold amount of motion being based on the physical environmental features corresponding to the portion of the map data. Determining whether the motion of the UE is consistent with the subset of the physical environmental features corresponding to the portion of the map data includes determining whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

An example non-transitory, processor-readable storage medium includes processor-readable instructions configured to cause a processor of a UE to: obtain motion data indicative of motion of the UE; obtain positioning information based on positioning signals received by the UE; determine a validity status of map data based on whether the positioning information, the motion of the UE, and the map data, that include locations of physical environmental features, are consistent, wherein the instructions are configured to cause the processor to determine the validity status as valid in response to the positioning information, the motion of the UE, and the map data being consistent; and determine at least one of a position estimate for the UE, or a direction of motion of the UE, based on the map data and based on the validity status being valid.

Implementations of such a storage medium may include one or more of the following features. The instructions configured to cause the processor to determine the at least one of the position estimate for the UE, or the direction of motion of the UE, include instructions configured to cause the processor to constrain at least one of the position estimate for the UE, or the direction of motion of the UE, based on the map data and based on the validity status being valid. The storage medium includes instructions configured to cause the processor to determine, based on the map data, based on the validity status being valid, and based on one or more first respective positioning signal measurements, a first portion of the positioning information to use to determine the at least one of the position estimate for the UE or the direction of motion of the UE. The first portion of the positioning information includes at least one of a pseudorange or a Doppler measurement. The instructions configured to cause the processor to determine the at least one of the position estimate for the UE, or the direction of motion of the UE, include instructions configured to cause the processor to disregard a second portion of the positioning information, based on one or more second respective positioning signal measurements, that has a corresponding cross-track component above a threshold value.

Also or alternatively, implementations of such a storage medium may include one or more of the following features. The instructions configured to cause the processor to determine the at least one of the position estimate for the UE, or the direction of motion of the UE, include instructions configured to cause the processor to determine the at least one of the position estimate for the UE, or the direction of motion of the UE, based on the map data only if the validity status is presently valid. The instructions configured to cause the processor to determine the validity status of the map data include instructions configured to cause the processor to change a status of the map data, from valid to invalid or from invalid to valid as appropriate, in response to determining that a consistency of the positioning information, the map data, and the motion of the UE changed. The instructions configured to cause the processor to determine whether the positioning information, the motion of the UE, and the map data are consistent include instructions configured to cause the processor to: determine a portion of the map data based on the positioning information; and determine whether the motion of the UE is consistent with a subset of the physical environmental features corresponding to the portion of the map data. The instructions configured to cause the processor to determine whether the motion of the UE is consistent with the subset of the physical environmental features corresponding to the portion of the map data include instructions configured to cause the processor to determine whether the motion of the UE is less than a threshold amount of motion in a particular direction, the threshold amount of motion being based on the physical environmental features corresponding to the portion of the map data. The configured to cause the processor to determine whether the motion of the UE is consistent with the subset of the physical environmental features corresponding to the portion of the map data include instructions configured to cause the processor to determine whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

DETAILED DESCRIPTION

Figure 1:
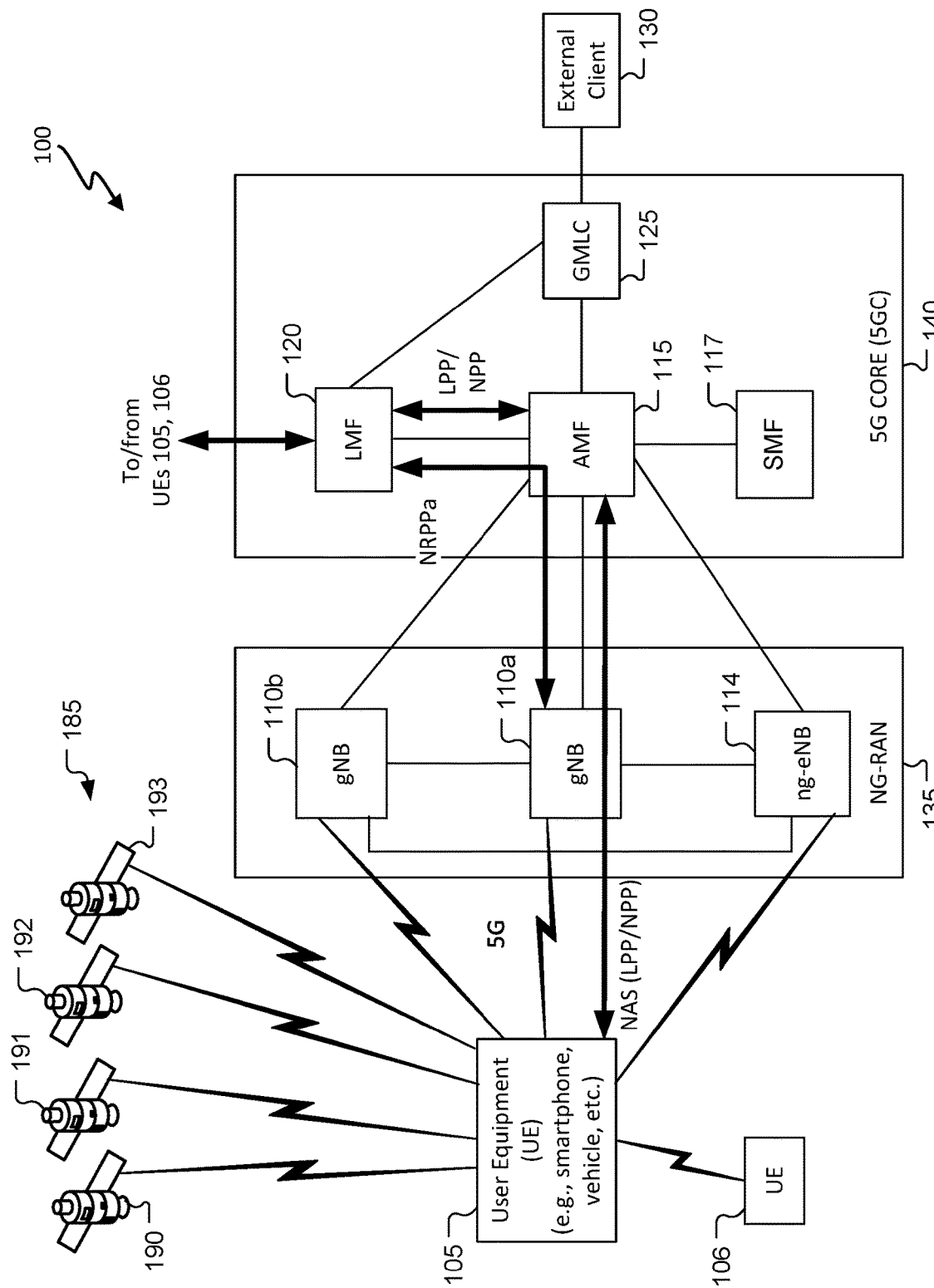
FIG. 1 is a simplified diagram of an example wireless communications system.

Techniques are discussed herein for using map data for positioning of user equipment (UE). For example, motion of a UE may be determined using one or more sensors such as an accelerometer, a magnetometer, and/or a gyroscope. Positioning information for the UE may be determined from positioning signals, independently of the motion determination. Map data (which may be three-dimensional map data) corresponding to an area in which the UE is disposed may be obtained, with the map data being independent of the positioning information and motion information indicative of the motion of the UE. The motion of the UE may be compared with map data corresponding to the positioning information to determine whether the motion is consistent with the map data, e.g., expected or not, based on one or more physical constraints indicated by the map data. If the motion is consistent with the map data, then the map data may be used to aid position determination for the UE. For example, the map data may be used to determine outlier measurements and ignore those measurements for determining a position estimate of the UE. As another example, the map data may be used to constrain possible directions of travel and/or positions of the UE, e.g., as outputs of a navigation application. Other configurations, however, may be used.

Items and/or techniques described herein may provide one or more of the following capabilities, as well as other capabilities not mentioned. Accuracy of position estimation of a UE may be improved. Accuracy of direction of travel of a UE may be improved. Repeatedly considering independent data may help prevent false confidence in map data used for aiding position determination for a UE. Accuracy of speed, SPS (Satellite Positioning System) time bias, and/or SPS frequency bias may be improved. Sensor biases and/or device attitude determination may be improved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
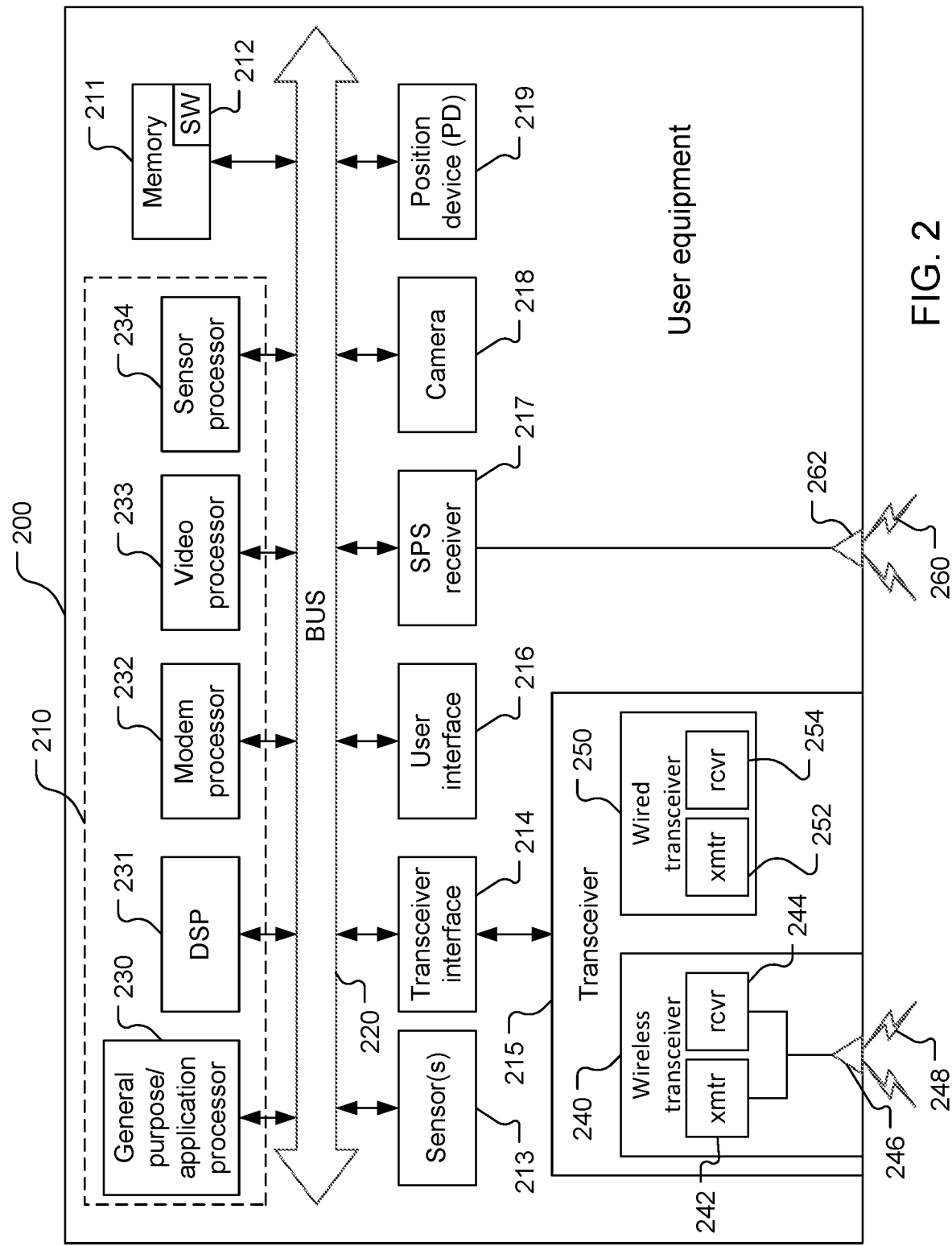
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
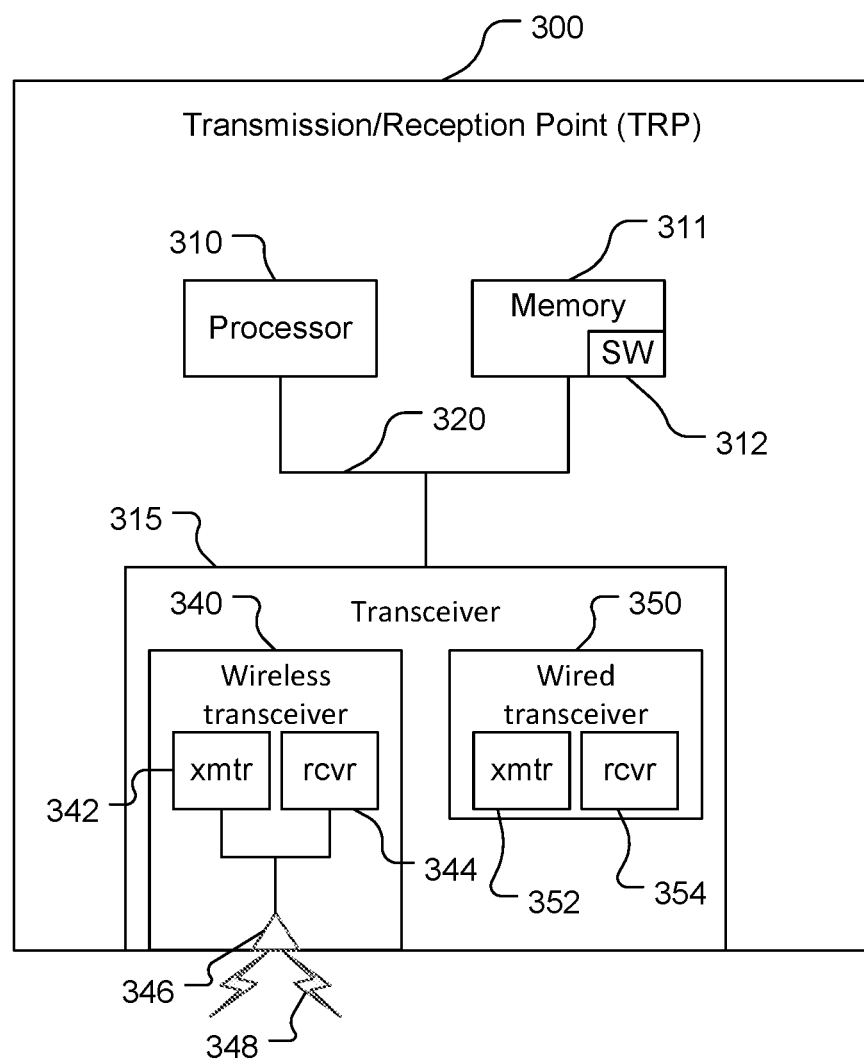
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
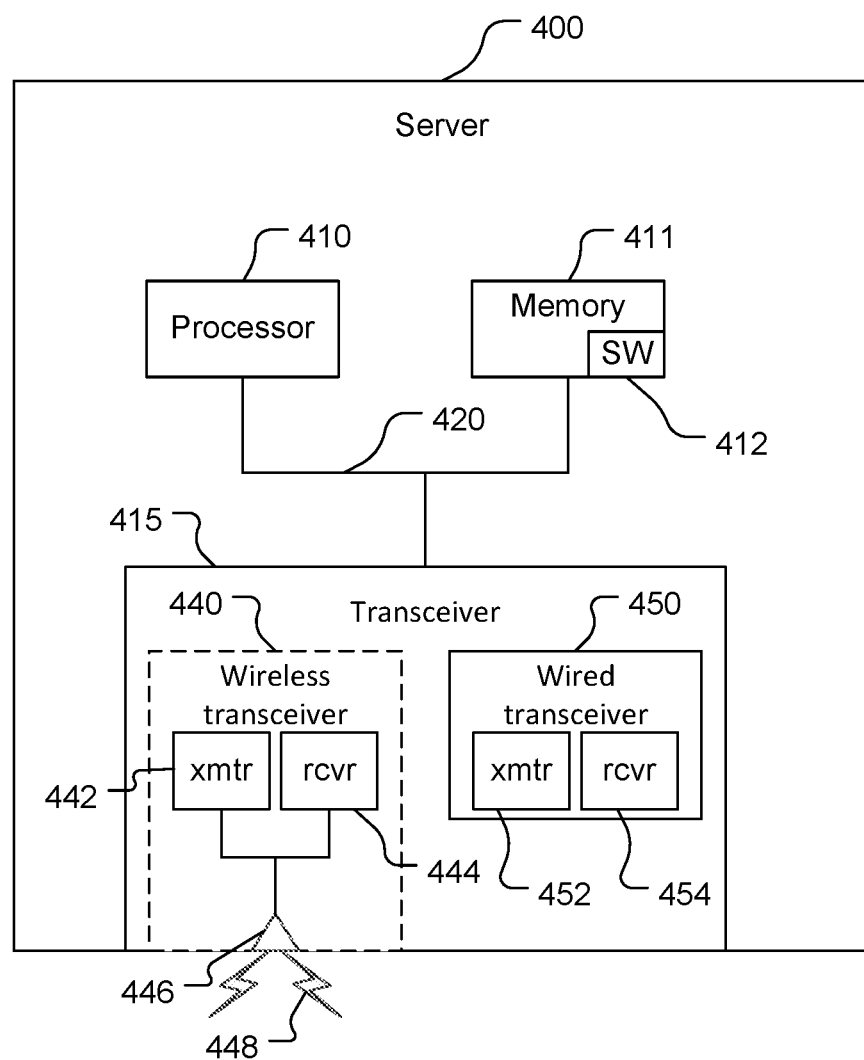
FIG. 4 is a block diagram of components of a server, various examples of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{RX \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Map Data for Positioning

Position determination, i.e., determining a position of an entity (e.g., a UE) such as one or more positions over time (e.g., motion) of the entity, may be difficult in environments (e.g., urban canyons) conducive to multipath reception of positioning signals (e.g., satellite signals, PRS from terrestrial-based TRPs, etc.) and/or if there is high dynamic movement of the entity. For example, significant motion of a UE in a data collection interval (i.e., between sampling of positioning signals) may cause aliasing. Further, supplementing a position determination with sensor measurements may improve positioning accuracy, but because sensors are prone to inaccuracy (e.g., gyroscope drift (often dependent on temperature), magnetic anomalies affecting magnetometer measurements, undersampling of measurements relative to UE motion, etc.), further accuracy improvements may be desirable. The position determination may determine a position estimate for the UE and/or a direction of motion of the UE, e.g., based on position over time, e.g., for use in navigation. Positioning information such as a position estimate and/or a direction of motion may be unreliable and/or of poor accuracy in multiplath environments and/or during high dynamic entity movement. A trajectory of the entity, however, is often aligned with one or more environmental constraints, i.e., physical features of an environment (e.g., a heading of a road, an angle of a building edge, a location of a road, a location of a sidewalk, a boundary of a body of water, etc.). The physical features may be defined in terms of locations of the features relative to one or more reference directions and/or relative to a reference coordinate system (e.g., the angle of the building edge relative to true north, points along the building edge in terms of latitude and longitude, etc.). Knowledge of the physical constraints may be used to improve positioning accuracy, e.g., navigation accuracy, for example by not using positioning information that is inconsistent with the physical constraints and/or by limiting entity direction and/or entity position based on the physical constraints.

Figure 5:
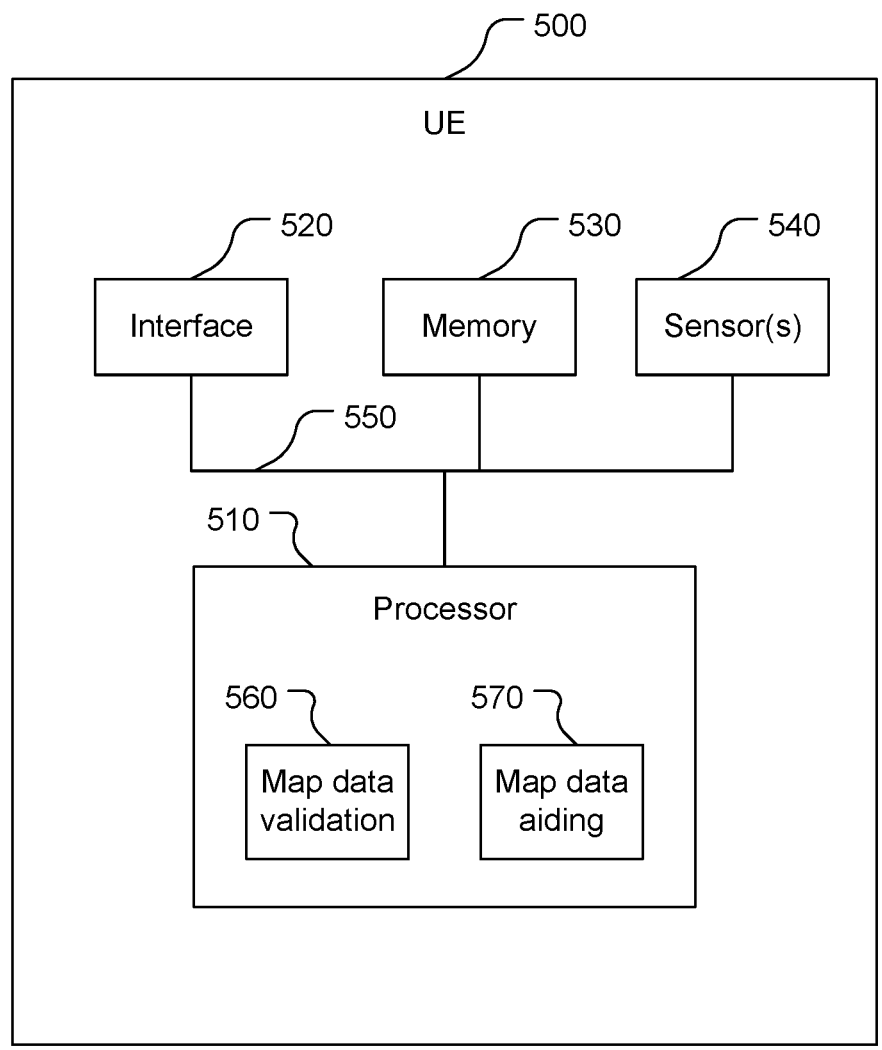
FIG. 5 is a simplified block diagram of an example user equipment.

Referring to FIG. 5, with further reference to FIGS. 1-4, a UE 500 includes a processor 510, an interface 520, a memory 530, and one or more sensors 540, communicatively coupled to each other by a bus 550. The UE 500 may include the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software with processor-readable instructions configured to cause the processor 510 to perform functions. The sensor(s) 540 may include the camera 218 and/or one or more of the sensor(s) 213 such as one or more three-dimensional accelerometers, one or more three-dimensional gyroscopes, and/or one or more three-dimensional magnetometers. One or more of the sensors 540 may comprise a micro electro-mechanical system (MEMS).

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a map data validation unit 560 and a map data aiding unit 570. The map data validation unit 560 may be configured to determine whether positioning information, motion of the UE 500, and map data are consistent with each other and determine that the map data are valid if so and to determine that the map data are invalid otherwise. The map data may include three-dimensional map data, i.e., data indicative of locations of physical features in three dimensions (e.g., a Lidar point cloud, indoor physical features on multiple building floors, etc.). The map data validation unit 560 may be configured to select a portion of available map data to be validated based on one or more criteria, e.g., based on a location of the UE 500, a type of the UE 500, a type of device associated with the UE 500 (e.g., a car, a bicycle), motion of the UE 500 (e.g., indicative of being in a car, being on a bicycle, being on a pedestrian, etc.). For example, the map data validation unit 560 may select map data in a vicinity of the UE 500, or may select a portion of available map data with the portion being relevant to the UE 500 (e.g., road data if the UE 500 is in a car). Alternatively, the map data validation unit 560 may use all available map data (at least for a region presently containing the UE 500) for validation. The map data validation unit 560 may use all available map data at one time and/or for one situation and may use a portion of available map data at another time and/or for another situation. The map data aiding unit 570 may be configured to use valid map data to disregard (e.g., eliminate or ignore) anomalous positioning information from consideration in determining the position of the UE 500 and/or to constrain possible position estimates for (including constraining position over time and thus motion of) the UE 500 based on the valid map data. Thus, a portion of positioning information (e.g., a pseudorange and/or a Doppler measurement) may be determined based on valid map data, and one or more positioning signal measurements used to determine a position estimate of the UE 500 and/or a direction of motion of the UE 500. Functionality of the map data validation unit 560 and the map data aiding unit 570 are discussed further below, and the description may refer to the processor 510 generally, or the UE 500 generally, as performing any of the functions of the map data validation unit 560 and/or the map data aiding unit 570.

Figure 6:
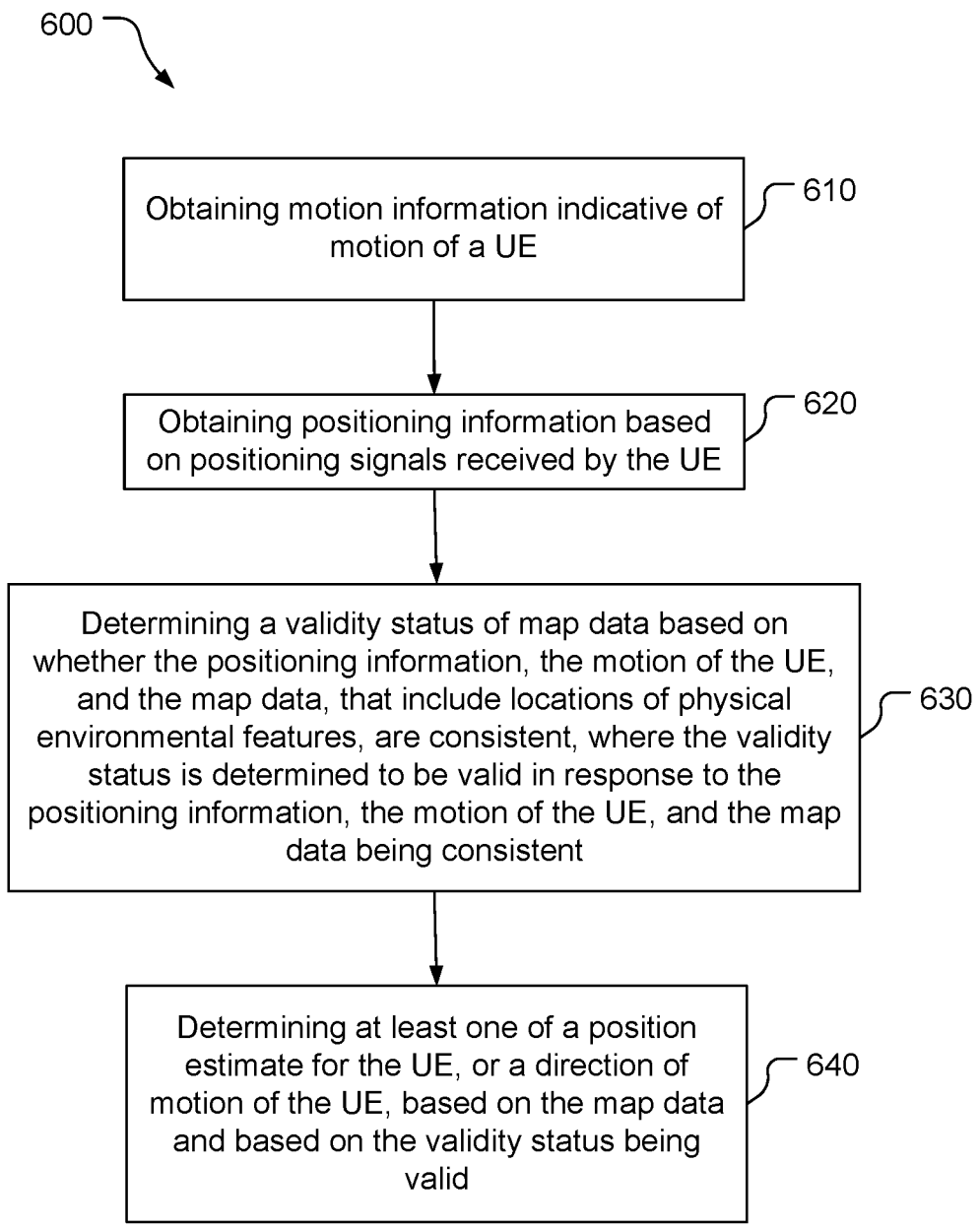
FIG. 6 is block flow diagram of a method for facilitating positioning determination of a UE.

Referring to FIG. 6, with further reference to FIGS. 1-5, a method 600 of determining position and/or motion of a UE includes the stages shown. The method 600 is, however, an example only and not limiting. The method 600 may be altered, e.g., by having stages added, removed, rearranged, combined, performed concurrently, and/or having single stages split into multiple stages.

At stage 610, the method 600 includes obtaining motion information indicative of motion of the UE. For example, the UE 500 may sense motion of the UE 500 using one or more of the sensor(s) 540. The processor 510 may analyze/process output data from the sensor(s) 540, e.g., camera data, lidar data, radar data, and/or relative positioning information (e.g., sensor sharing), to determine the motion of the UE 500. One or more of the sensor(s) 540, the transceiver 215, and/or the sensor processor 234 possibly in combination with the processor 510 and the memory 530, may comprise means for obtaining motion information indicative of motion of the UE and/or means for sensing motion of the UE. As another example, an entity other than the UE 500 may obtain sensor information, e.g., sensor measurements, from the UE 500 and/or processed sensor information that indicates motion of the UE 500. For example, the processor 310, the memory 311, the wireless receiver 344, and the antenna 346 may comprise means for obtaining motion information indicative of motion of the UE. Also or alternatively, the processor 410, the memory 411, and the wired receiver 354 and/or the wireless receiver 444 and the antenna 446, may comprise means for obtaining motion information indicative of motion of the UE.

At stage 620, the method 600 includes obtaining positioning information based on positioning signals received by the UE. For example, the interface 520 may receive one or more positioning signals such as one or more SPS signals via the SPS receiver 217 and/or one or more PRS signals from one or more TRPs 300 via the antenna 246 and the wireless receiver 244. The processor 510 may process the signal(s) to determine positioning information such as one or more pseudoranges, one or more Doppler measurements, one or more position estimates, velocity information, etc. The processor 510 and the interface 520 may comprise means for obtaining positioning information. Also or alternatively, another entity may receive one or more positioning signal measurements and/or other positioning information (e.g., one or more position estimates) from the UE 500. For example, the processor 310, the memory 311, the wireless receiver 344, and the antenna 346 may comprise means for obtaining positioning information. Also or alternatively, the processor 410, the memory 411, and the wired receiver 254 and/or the wireless receiver 444 and the antenna 446, may comprise means for obtaining positioning information.

At stage 630, the method 600 includes determining a validity status of map data based on whether the positioning information, the motion of the UE, and the map data, that include locations of physical environmental features, are consistent, where the validity status is determined to be valid in response to the positioning information, the motion of the UE, and the map data being consistent. For example, as discussed in more detail below, the map data validation unit 560 may determine whether the positioning information, the motion of the UE 500, and map data regarding an environment of the UE 500 are consistent, and if so, determine that a validity status of the map data is "valid." The processor 510, possibly in combination with the memory 530, may comprise means for determining whether the positioning information, the motion of the UE, and the map data are consistent. As another example, one or more other entities may determine whether there is such consistency. For example, the processor 310, possibly in combination with the memory 311, and/or the processor 410, possibly in combination with the memory 411, may comprise means for determining whether the positioning information, the motion of the UE, and the map data are consistent.

At stage 640, the method 600 includes determining at least one of a position estimate for the UE, or a direction of motion of the UE, based on the map data and based on the validity status being valid. For example, the processor 510 may use the map data to influence a position estimate and/or determined motion of the UE 500 to be consistent with the map data (e.g., such that a position estimate or determined motion of a vehicle is on or along a road, or a position estimate or determined motion of a UE associated with a pedestrian is on or along a sidewalk, etc.). The processor 510 and the memory 530, the processor 310 and the memory 311, and/or the processor 410 and the memory 411 may comprise means for determining at least one of a position estimate for the UE or a direction of motion of the UE.

Figure 7:
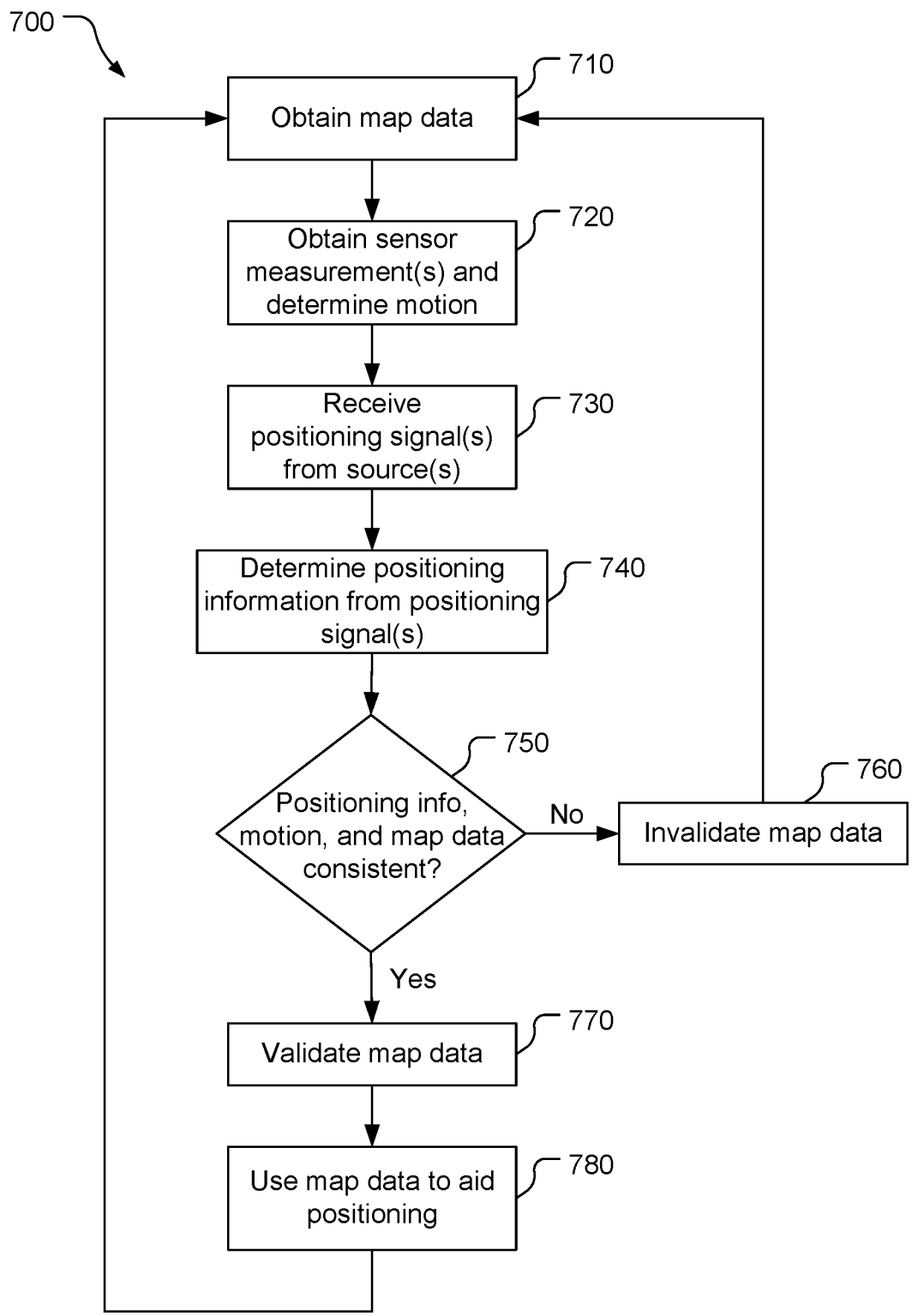
FIG. 7 is a block flow diagram of an example implementation of the method shown in FIG. 6.

Referring to FIG. 7, with further reference to FIGS. 1-6, a method 700 of determining position and/or motion of a UE includes the stages shown. The method 700 is, however, an example only and not limiting. The method 700 is an example implementation of the method 600. The discussion of the method 700 assumes that the UE 500 performs the method 700, but some or all of the method 700 may be performed by one or more other entities alone or in combination. For example, the UE 500 may send information to another entity (e.g., the server 400 and/or the TRP 300) that determines whether map data are valid and performs positioning based on valid map data.

At stage 710, map data are obtained. The map data may be received from a network entity such as the TRP 300 or the server 400, or may be retrieved from memory if previously received or otherwise stored (e.g., during manufacture of the UE 500, downloaded to the UE 500 from the Internet, etc.). For example, the UE 500 receives map data from a serving TRP 300 via the interface 520 and stores the map data in the memory 530. The UE 500 may receive map data based on location of the UE 500 (e.g., a coarse location such as a cell) and/or based on a serving TRP 300. For example, in response to the UE 500 waking up, or starting, or being handed off to a different TRP 300, an inquiry may be made as to whether the UE 500 has appropriate map data (e.g., a tile including the present location of the UE 500) and the appropriate map data may be sent to the UE 500 if the UE 500 does not have the appropriate map data stored (e.g., current map data for the area in which the UE 500 is disposed). The map data corresponds to and spans a region that includes the present location of the UE 500. The map data may, for example, be a map tile spanning a rectangular area several kilometers by several kilometers. The map data may comprise a dataset of absolute locations of environmental constraints. The absolute locations may be defined in any of a variety of ways, e.g., in various coordinate systems such as latitude and longitude of the Earth, UTM (Universal Transverse Mercator) projections (distances (e.g., kilometers) east and north of a reference location (e.g., on the equator)), etc.

Figure 8:
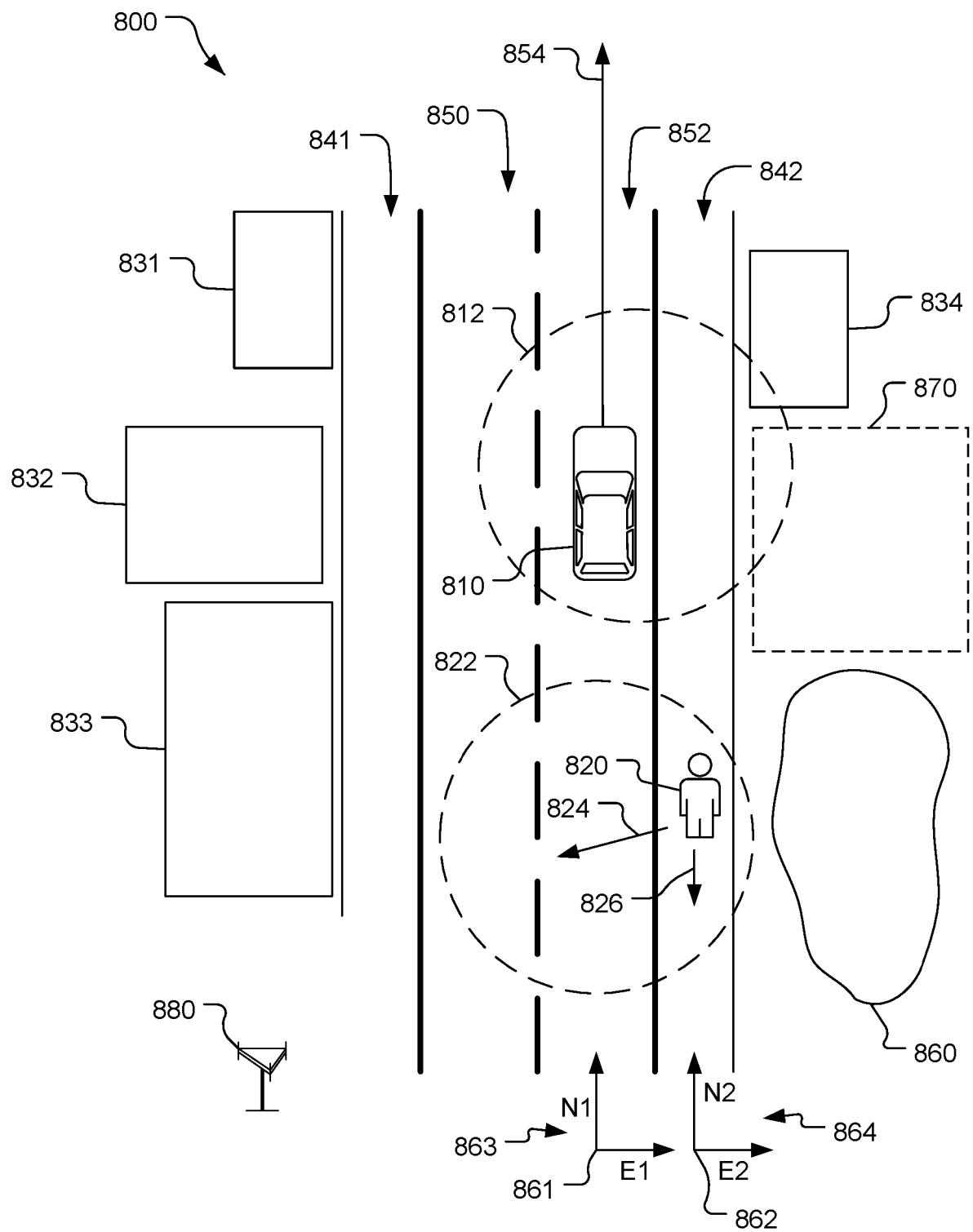
FIG. 8 is a simplified diagram of an environment including a vehicle UE and a UE associated with a person.

For example, referring also to FIG. 8, the map data may be received from a base station 880 (which is an example of the TRP 300) and may provide locations of physical constraints in an environment 800, such as locations of corners of buildings 831, 832, 833, 834, edges of the buildings 831-834, locations of edges of sidewalks 841, 842, locations of edges of a road 850, etc. The locations may be relative to one or more reference locations such as a reference location 861 for the road 850 or a reference location 862 for the sidewalk 842. The map data may provide constraints regarding where a UE, e.g., associated with a vehicle 810 and/or associated with a person 820, may move and/or where a UE is likely to move. For example, the vehicle 810 may be limited to moving along the road 850 by physical constraints (e.g., curbs, medians, signs and markings indicative of legal constraints, etc.). While this may not be an absolute constraint, i.e., the vehicle 810 could deviate from the road 850, the constraints increase the likelihood that the vehicle 810 will remain on the road 850, and the likelihood that the vehicle 810 will move along the road 850, and thus have a heading similar to a heading of the road 850. In this example, the section of the road 850 shown and the sections of the sidewalks 841, 842 shown are straight, but non-straight roads and/or sidewalks may be used, e.g., curved road sections with headings changing with the road, a curved sidewalk next to a straight road, etc. The discussion herein uses the straight road 850 and the straight sidewalks 841, 842 as examples for simplicity, but the discussion applies to other configurations of physical constraints. The environment 800 includes a pond 860 and an open area 870 in which there are no physical constraints mapped, or at least no physical constraints that may be used to determine whether UE motion is consistent with the physical constraints. The map data may include locations defining a perimeter of the pond 860 and a perimeter of the open area 870. The map data may include indications of the types of physical constraints in order to help the processor 510 determine positioning information. For example, the map data may indicate whether various types of entities are likely to be in various locations (e.g., a car unlikely to be on the sidewalk 841 or in the pond 860, a pedestrian likely to be on the sidewalk 841 but not the road 850 (at least away from a crosswalk), a car unlikely to be in the open area 870 but a pedestrian likely to be in the open area 870, etc.).

At stage 720, one or more sensor measurements are obtained and motion information determined from the measurement(s). For example, one or more of the sensor(s) 540 take measurements, e.g., of acceleration, magnetic field, and/or orientation. The processor 510 (e.g., the map data validation unit 560) may process the measurement values to determine motion, or lack thereof, of the UE 500. The motion may, for example, be determined in terms of a reference coordinate system, which may be based on the map data. In the example environment 800, for simplicity, the road 850 is a north-south road directed to true north and the sidewalks 841, 842 are north-south sidewalks. Reference coordinate systems 863, 864 are based on the map data, with vertical axes in directions of expected travel (e.g., a heading of the road 850 and a heading of the sidewalk 842, respectively). In this example, the reference coordinate systems 863, 864 are both north-east coordinate systems with origins at the reference locations 861, 862, respectively. For example, motion of the UE 500 may be determined in terms of distance north and distance east, and may be determined from a reference location, e.g., an example location may be 1.2 m north and −2.3 m east from the reference location 861. The motion of the UE 500 may be determined using the sensor measurement(s) alone, without use of other information such as positioning signals from one or more satellites or one or more base stations or other source(s) of positioning signals, and without use of the map data. Also or alternatively, motion of the UE 500 may be determined using information other than sensor measurement(s).

At stage 730, one or more positioning signals are received from one or more positioning signal sources. For example, the UE 500 may receive one or more SPS signals from one or more of the satellites 190-193 and/or may receive one or more PRS from one or more TRPs 300, e.g., the base station 880. The signal(s) may be received by the interface 520 and provided by the interface 520 to the processor 510.

At stage 740, positioning information is determined from the positioning signal(s). For example, the UE 500 (or other entity) may use one or more positioning techniques to determine one or more ranges (e.g., pseudoranges), one or more position estimates, etc. The UE 500 may determine the positioning information from the positioning signal(s) independently of other information such as the sensor measurement(s), e.g., without using any sensor measurements or the map data. Also or alternatively, sensor measurement(s) may be used to determine positioning information, e.g., using dead reckoning to determine position and/or motion.

At stage 750, a determination is made as to whether the positioning information determined at stage 740, the motion of the UE 500 determined at stage 720, and the map data are consistent. For example, the map data validation unit 560 may determine whether the three independent sources of information, i.e., the positioning information, the motion of the UE 500, and the map data, conflict. The map data validation unit 560 may, for example, determine whether the motion of the UE 500 is consistent with the physical constraints of a portion of the map data corresponding to a vicinity of the UE 500 based on the positioning information.

For example, the positioning information may indicate that the vehicle 810 is in a vehicle region 812 and determine that the person 820 is in a region 822. The map data validation unit 560 of the vehicle 810 may retrieve the map data from the memory 530 and analyze the physical constraints in the region 812 and the motion of the vehicle 810 to determine whether the motion of the vehicle 810 is within the bounds of the physical constraints of the region 812 and/or whether the motion is within expectations of motion of the vehicle 810 in the region 812. Similarly, the map data validation unit 560 of a UE associated with the person 820 may retrieve the map data from the memory 530 and analyze a subset of the physical constraints corresponding to the region 822 and the motion of the person 820 to determine whether the motion of the person 820 (motion of the UE associated with the person 820) is within the bounds of the physical constraints of the region 822 and/or whether the motion is within expectations of motion of the person 820 in the region 822. Whether motion meets expectations may be determined based on whether the motion is within one or more thresholds. Thus, precision of the sensor(s) 540 may affect the ability to determine whether the positioning information, the motion of the UE 500, and the map data are consistent. For example, MEMS sensors made by Qualcomm® Incorporated may provide the ability to determine data consistency that other sensors do not. If no map data are available, e.g., no map data were obtained at stage 710 or the UE 500 is in a region where there are no physical constraints on the motion of the UE 500, such as the region 870, then the method 700 may proceed to stage 760, discussed further below, or may return to stage 710 without performing stage 760.

The motion of the UE 500 may be determined to be consistent or inconsistent with the subset of the physical environmental features corresponding to the portion of the map data in a variety of ways. For example, the map data validation unit 560 may determine whether the motion of the UE 500 indicates that the UE 500 has exited a UE-acceptable area (such as the sidewalk 842), that the UE 500 has entered a UE-unacceptable area (such as the pond 860), that the UE 500 is following a UE-acceptable trajectory (e.g., along the sidewalk 842 or along the road 850), or that the UE 500 has deviated from the UE-acceptable trajectory, e.g., by more than a threshold amount (e.g., any amount, a threshold distance, a threshold angle from an acceptable heading (e.g., the heading of the road 850 or the sidewalk 842, etc.).

In the example shown in FIG. 8, the UE 500 of the vehicle 810 may determine that the positioning information, the motion of the UE 500, and the map data are consistent. In the example environment 800, given the physical constraints of the road 850, the expected direction of travel of the vehicle 810 may be a straight line north, with a deviation transverse to the expected direction of travel limited to a width of the road 850, or a width of a lane 852 of the road 850 if the road 850 is a two-way street. The map data validation unit 560 of the vehicle 810 may determine that the positioning information, the motion of the UE 500, and the map data are consistent in response to the motion of the vehicle 810 being in a direction 854 that meets the expected direction of travel, i.e., northerly without an east-west deviation exceeding a threshold value (e.g., a width of the lane 852, a threshold angle relative to the heading of the road 850 (here, north or south)). In the example shown in FIG. 8, the vehicle 810 is moving in the direction 854 that meets expectations and thus the map data validation unit 560 of the vehicle 810 would determine that the positioning information, the motion of the UE 500, and the map data are consistent.

In the example shown in FIG. 8, the UE 500 of the person 820 may determine that the positioning information, the motion of the UE 500, and the map data are inconsistent. In the example environment 800, given the physical constraints of the sidewalk 842, an expected direction of travel 826 of the person 820 may be a straight line either north or south (reciprocal acceptable headings of the sidewalk 842), with a deviation transverse to the expected direction of travel limited to a threshold distance (e.g., a width of the sidewalk 842) from (and orthogonal to) the expected direction of travel, or a threshold angle relative to the expected direction of travel (e.g., the acceptable heading(s) of the sidewalk (here, north or south)). The map data validation unit 560 associated with the person 820 may determine that the positioning information, the motion of the UE 500, and the map data are inconsistent in response to the motion of the UE 500 associated with the person 820 not meeting the expected motion (e.g., moving with an east-west deviation more than the threshold value and/or a motion in an unacceptable direction (e.g., more than a threshold angle relative to the expected motion, e.g., traveling perpendicular to a direction of traffic)). For example, the map data validation unit 560 associated with the person 820 may determine that the positioning information, the motion of the UE 500, and the map data are consistent in response to the motion of the UE 500 associated with the person 820 being in a direction 824 that does not meet the expected direction of travel, i.e., northerly without an east-west deviation exceeding a threshold value (e.g., the width of the sidewalk 842). Here, the map data validation unit 560 may determine that a component of motion of the person 820 on the east-west axis for the direction 824 of travel exceeds the threshold value.

Determining that the positioning information, motion, and map data are inconsistent may be used in a variety of manners. For example, a determination that motion deviates from expectation may be used to trigger an alert, e.g., to help a pedestrian stay out of the road 850, or to help a driver keep the vehicle 810 on the road 850. As another example, such a determination may be used to initiate one or more actions such as placing an emergency call, or at least getting an emergency call ready, based on motion in a dangerous direction (e.g., the vehicle 810 heading toward the sidewalk 841, 842 or toward the building 832 or toward the pond 860, etc.).

If the positioning information, the motion of the UE 500, and the map data are determined at stage 750 to be inconsistent, then the method 700 proceeds to stage 760. At stage 760, the map data validation unit 560 determines the map data to be (and possibly designates the map data as) invalid. If map aiding (e.g., discussed with respect to stage 780) is on, then map aiding is turned off (which may occur automatically by determining the map data to be invalid). The method 700 returns to stage 710 such that the map data may be repeatedly determined to be valid or invalid. Thus, the validity status of map data may be determined to be valid and later changed to invalid, or determined to be invalid and later changed to valid (e.g., the designation of being invalid (or valid) may be temporary). For example, a valid/invalid determination may be made about once every second. The latency of the validation decision (e.g., the time to a first validation decision or the time between consecutive validation decisions) may be low enough to guard against usage of map data to affect a position determination incorrectly. Further, the same map data may be concurrently determined to be valid by one UE 500 and determined to be invalid by another UE 500, e.g., because the motion of one UE 500 conforms to expectations and the motion of the other UE 500 does not conform to expectations.

The valid/invalid determination of the map data may not be an indication of the correctness of the map data, but an indication of whether the map data may be used to aid in a position determination for the UE 500. The map data are determined to be invalid whether the motion is inconsistent with the map data due to the motion deviating from expectation based on correct map data (i.e., map data that reflects reality) or the motion deviating from expectation because the map data are incorrect (not reflecting reality) even if the motion would be consistent with expectation were the map data correct. Map data may be deleted, changed, or added in response to enough samples of UE motion information being collected to develop a sufficient confidence that existing map data are incorrect or that one or more physical constraints should be included in the map data. Thus, map data may be crowdsourced. The UE 500 may send indications to the server 400 and/or the TRP 300 regarding map data changes. For example, the UE 500 may determine a map data change based on repeated similar inconsistencies with the existing map data, and/or or may report the repeated inconsistencies to the TRP 300 and/or the server 400 and the TRP 300 and/or the server 400 may determine what, if any, change to make to the map data. This may help keep map data updated and correct even when physical features of an area change, e.g., due to construction, natural erosion, etc. Location determinations may be used as inputs to a machine learning algorithm or neural network to determine changes to map data.

If the positioning information, the motion of the UE 500, and the map data are determined at stage 750 to be consistent, then the method 700 proceeds to stage 770. At stage 770, the map data are determined to be (and possibly designated as) valid and the method 700 proceeds to stage 780. The map data that are determined to be valid at stage 770 or invalid at stage 760 may be all of the map data (e.g., an entire tile) or a subset of the map data, e.g., the map data corresponding to an area containing the UE 500 but less than the entire area spanned by the map data. The subset of the map data may, for example, span a circular area centered at the UE 500, where a radius of the area may depend on motion of the UE 500 (e.g., with the radius depending on a speed of the UE 500, e.g., with the radius being larger for higher speeds).

At stage 780, map aiding is turned on and the map data are used to aid positioning of the UE 500. For example, the map data aiding unit 570 may use valid map data (i.e., map data whose validity status has been determined to be "valid" (and thus may use map data if the validity status of the map data is presently valid and not use map data otherwise)) to apply one or more constraints on position determination of the UE 500. The map data aiding unit 570 may, for example, use the valid map data to improve position determination based on positioning signals, e.g., by inhibiting use of positioning signal outliers. This may help avoid using multipath positioning signals to determine position of the UE 500, and thus may improve the accuracy of the determined position. As another example, the map data aiding unit 570 may constrain a direction of motion of the UE 500 to be within an expected range of directions of motion based on the valid map data which may improve location accuracy. As another example, the map data aiding unit 570 may constrain a position estimate for the UE 500 to be within one or more expected regions, or not to be within one or more unexpected regions, based on the valid map data. The processor 510, possibly in combination with the memory 530, may provide means for constraining a position estimate and/or a determined direction of motion of the UE. Using map aiding, a navigation filter (e.g., a Kalman filter, a particle filter, etc.) may use external information to align measurement inputs and navigation solution outputs with a reduced range of possible navigation solutions.

Figure 9:
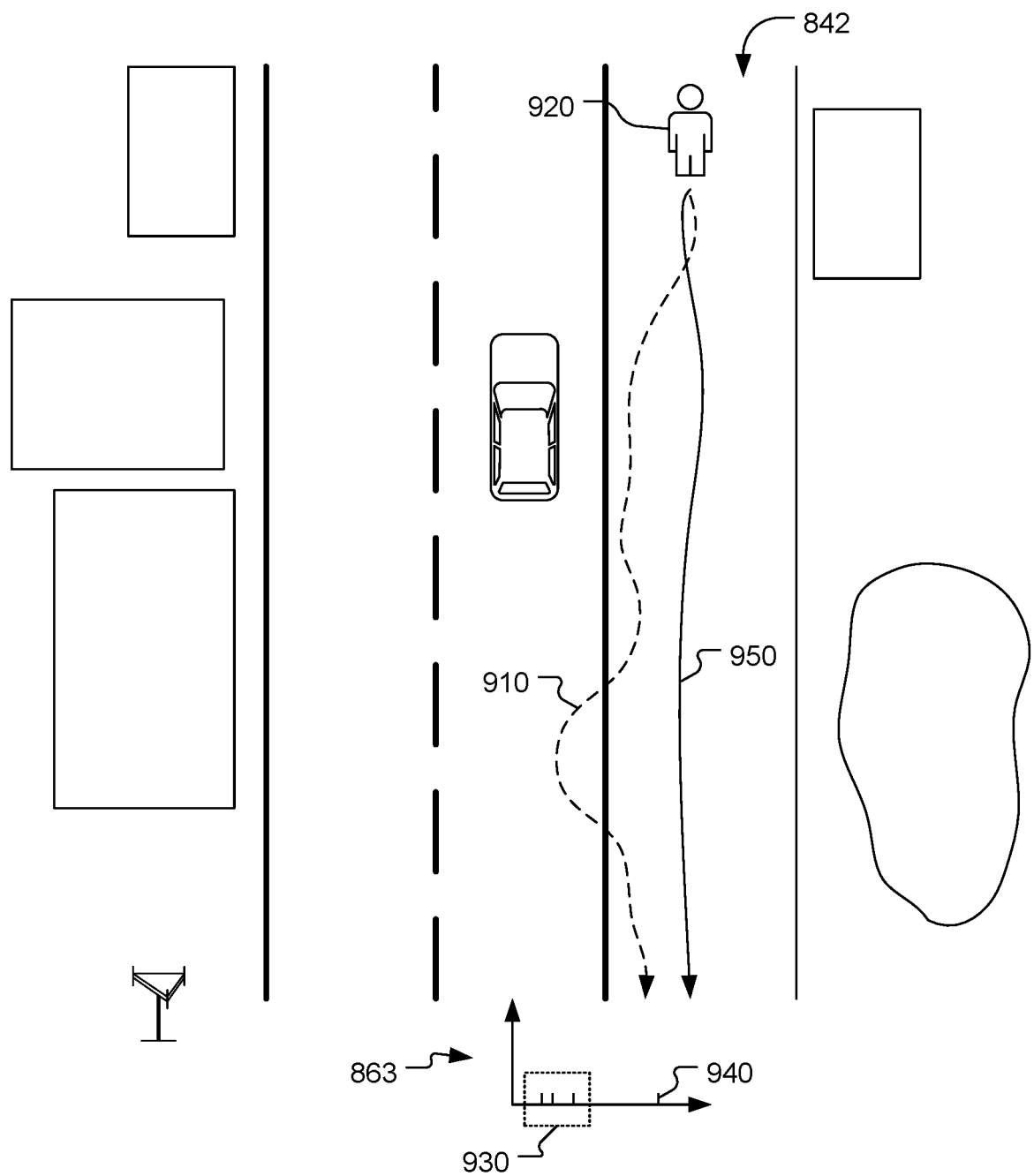
FIG. 9 is a simplified diagram of the environment shown in FIG. 8 with map data aiding applied to positioning of the UE associated with the person.

Referring also to FIG. 9, the map data aiding unit 570 may determine positioning signal outliers by determining pseudorange residual components in an expected direction of travel of the UE 500 (called an "along-track direction") and transverse (orthogonal) to the expected direction of travel (called a "cross-track direction"). For example, for the vehicle 810, the along-track direction is north and the cross-track direction is east relative to the reference location 861 (i.e., an east-west axis, with east of the reference location 861 being positive values and west being negative values). The map data aiding unit 570 may determine pseudorange residuals (i.e., differences between actual and predicted pseudoranges (based on coarse location of the UE 500)). The map data aiding unit 570 may be configured to project the pseudorange residuals for the vehicle 810 onto the reference coordinate system 863 for the vehicle 810. Pseudorange residuals based on line-of-sight (LOS) signals will have small amounts of projection onto the cross-track direction and will be clustered together while projections with large cross-track direction values will be due to multipath travel and can be disregarded (e.g., rejected or ignored), not being used for determination of the position estimate of the UE 500 (e.g., not used in a Kalman filter navigation filter). The map data aiding unit 570 may disregard positioning information (e.g., pseudorange(s)) based on respective positioning signal measurement(s) that has(have) corresponding cross-track component(s) above a threshold value. The map data aiding unit 570 (e.g., the processor 510 possibly in combination with the memory 530) may comprise means for disregarding positioning information. The map data aiding unit 570 may determine whether to use a pseudorange (or other measurement based on the signal measured to determine the pseudorange) based on a coordinate system based on (e.g., defined by) a heading of map data. The map data aiding unit 570 may determine residuals relative to the position of the UE 500, and separate the residuals into along-track and cross-track components. If there is a cluster, e.g., a cluster 930, of cross-track components (e.g., a threshold quantity of residuals within a threshold distance), then pseudoranges corresponding to cross-track components, e.g., the component 940, outside of the cluster 930 may be ignored and pseudoranges corresponding to cross-track components inside the cluster 930 used to determine positioning information for the UE 500. If no cluster is found, then all the pseudoranges may be used to determine the positioning information. As another example, if possible locations based on a pseudorange are impossible or unlikely based on the map data (e.g., a UE 500 is a vehicle and possible locations place the UE 500 in the pond 860 or on the building 834), then the pseudorange (or any measurement based on the signal yielding the pseudorange) may be ignored. By not using pseudoranges based on multipath signals to determine the position estimate, accuracy of the position estimate may be improved. Using similar techniques, outlier Doppler measurements (i.e., Doppler measurements that are inconsistent with map data) may be ignored, thus not being used to determine the position estimate of the UE 500 and thus improving the accuracy of the position estimate.

The map data aiding unit 570 may constrain a direction of motion of the UE 500 and/or a possible position of the UE 500 to be within a range of expected directions and/or within expected locations, respectively, based on the valid map data. This may be referred to as an inequality constraint in that the map data aiding unit 570 prevents the direction of travel or position estimate from being inequal to a heading or expected position based on the map data. For example, the position of the vehicle 810 is prevented from being inequal to a position on the road 850 while the map data are valid. With the map data being valid, the map data aiding unit 570 knows that the UE 500 motion is consistent with the map data, so the map data aiding unit 570 may constrain the position estimate for the UE 500 and/or the direction of travel of the UE 500 determined, for example, by a navigation filter to be within an expected range of directions of travel or expected locations based on the map data (e.g., headings of roads, boundaries of roads, etc.). For example, the map data aiding unit 570 may constrain a direction of travel of a person 920 to be within a threshold number of degrees of an axis of the sidewalk 842, e.g., the along-track direction of the sidewalk 842 plus or minus a threshold angle (e.g., +/−10° or +/−5°. As another example, the map data aiding unit 570 may constrain the position estimate of the UE 500 to be within one or more expected position areas of the valid map data, e.g., on the sidewalk 842. Thus, for example, if unconstrained position estimates result in a path 910 for the person 920, the map data aiding unit 570 may constrain the position estimates to the sidewalk 842, resulting in determined position estimates on the sidewalk 842, and an aided path 950. This may improve position accuracy, improve accuracy of paths recorded by the UE 500 (e.g., a fitness app, a hiking app, etc.), and/or provide better visual representations of paths traveled by the UE 500. The processor 510 may respond to the map data becoming invalid by turning the aiding off and not constraining the possible directions of travel and/or possible positions of the UE 500.

Implementations of the method 600 may include one or more features of the method 700 and/or one or more other features. Implementations of the method 600 may include one or more of the following features. In an example implementation, determining the at least one of the position estimate for the UE, or the direction of motion of the UE, comprises constraining at least one of the position estimate for the UE, or the direction of motion of the UE, based on the map data and based on the validity status being valid. For example, the processor 510 may determine a position of the UE 500, determine that this position is inconsistent with map data, and in response to determining this inconsistency, report a modified position with the modified position being consistent with the map data. In another example implementation, the method 600 may include determining, based on the map data, based on the validity status being valid, and based on one or more first respective positioning signal measurements, a first portion of the positioning information to use to determine the at least one of the position estimate for the UE or the direction of motion of the UE. For example, the processor 510 may select a pseudorange that has a cross-track component within a threshold value (e.g., within a threshold of other cross-track components of other pseudoranges) and use this pseudorange to determine position of the UE 500 and/or direction of motion of the UE 500. The processor 510 (possibly in combination with the memory 530), the processor 310 (possibly in combination with the memory 311), and/or the processor 410 (possibly in combination with the memory 411) may comprise means for determining the first portion of the positioning information. In another example implementation, the first portion of the positioning information includes a pseudorange and/or a Doppler measurement. In another example implementation, determining the at least one of the position estimate for the UE, or the direction of motion of the UE, comprises disregarding a second portion of the positioning information, based on one or more second respective positioning signal measurements, that has a corresponding cross-track component above a threshold value. For example, outlier positioning information, having cross-track components higher than a threshold, may be disregarded when determining UE position and/or direction of UE motion. For example, the pseudorange corresponding to the component 940, being outside the cluster 930 (outside a threshold distance) may not be used to determine the location and/or direction of motion of the UE 500.

Also or alternatively, implementations of the method 600 may include one or more of the following features. In an example implementation, determining the at least one of the position estimate for the UE, or the direction of motion of the UE, is based on the map data only if the validity status is presently valid. For example, the processor may use the map data to determine UE position and/or direction of travel if the map data is valid and otherwise not use the map data to determine UE position and/or direction of travel (e.g., not determine position and/or direction of travel or determine position and/or direction of travel without using the map data). In another example implementation, the method 600 may include changing the validity status of the map data, from valid to invalid or from invalid to valid as appropriate, in response to determining that a consistency of the positioning information, the map data, and the motion of the UE changed. The validity status of map data may be determined to be valid and later changed to invalid in response to the consistency of the positioning information, the map data, and the motion of the UE changing from consistent to inconsistent. The validity status of map data may be determined to be invalid and later changed to valid in response to the consistency of the positioning information, the map data, and the motion of the UE changing from inconsistent to consistent. The processor 510 (possibly in combination with the memory 530), the processor 310 (possibly in combination with the memory 311), and/or the processor 410 (possibly in combination with the memory 411) may comprise means for changing the validity status of the map data.

Also or alternatively, implementations of the method 600 may include one or more of the following features. In an example implementation, determining whether the positioning information, the motion of the UE, and the map data are consistent comprises: determining a portion of the map data based on the positioning information; and determining whether the motion of the UE is consistent with a subset of the physical environmental features corresponding to the portion of the map data. For example, a processor may identify a region 812 based on a position of the vehicle 810 and may determine whether movement of the vehicle 810 is consistent with geometry of the road 850 within the region 812. The processor 510 (possibly in combination with the memory 530), the processor 310 (possibly in combination with the memory 311), and/or the processor 410 (possibly in combination with the memory 411) may comprise means for determining the portion of the map data and means for determining whether the motion of the UE is consistent with the subset of the physical environmental features corresponding to the portion of the map data. In another example implementation, determining whether the motion of the UE is consistent with the subset of the physical environmental features corresponding to the portion of the map data comprises determining whether the motion of the UE is less than a threshold amount of motion in a particular direction, the threshold amount of motion being based on the physical environmental features corresponding to the portion of the map data. For example, a processor may determine whether motion of the vehicle 810 has an east-west component that is less than a width of the lane 852. As another example, a processor may determine whether motion of the person 820 has an east-west component that is less than a width of the sidewalk 842. In another example implementation, determining whether the motion of the UE is consistent with the subset of the physical environmental features corresponding to the portion of the map data comprises determining whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory. For example, a processor may determine whether the vehicle 810 has departed from the road 850, and/or whether the vehicle 810 has entered the sidewalk 842 or the pond 860, and/or whether the vehicle 810 is moving within the lane 852, and/or whether the vehicle 810 is moving in a trajectory leading out of the lane 852.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a receiver configured to receive positioning signals;
a sensor configured to provide sensor output data;
a memory; and
a processor communicatively coupled to the receiver, the sensor, and the memory, wherein the processor is configured to:
obtain positioning information based on the positioning signals;
obtain motion of the UE based on the sensor output data;
obtain available map data that includes locations of physical environmental features;
select at least a portion of the available map data based on the motion of the UE;
determine a validity status of the portion of the available map data based on whether the positioning information, the motion of the UE, and the portion of the available map data are consistent, wherein the processor is configured to determine the validity status of the portion of the available map data as valid in response to the positioning information, the motion of the UE, and the portion of the available map data being consistent, and as invalid otherwise; and
determine at least one of a position estimate for the UE and a direction of motion of the UE constrained by the portion of the available map data based on the validity status of the portion of the available map data being valid and without being constrained by the portion of the available map data based on the validity status of the portion of the available map data being invalid.

2. The UE of claim 1, wherein the processor is configured to determine, based on the portion of the available map data, based on the validity status of the portion of the available map data being valid, and based on one or more first respective positioning signal measurements, a first portion of positioning information to use to determine the at least one of the position estimate for the UE or the direction of motion of the UE.

3. The UE of claim 2, wherein the first portion of positioning information includes at least one of a pseudorange or a Doppler measurement.

4. The UE of claim 2, wherein to determine the at least one of the position estimate for the UE or the direction of motion of the UE the processor is configured to disregard a second portion of the positioning information, based on one or more second respective positioning signal measurements, that has a corresponding cross-track component above a threshold value.

5. The UE of claim 1, wherein the processor is configured to determine the at least one of the position estimate for the UE or the direction of motion of the UE based on the map data only if the validity status of the portion of the available map data is valid.

6. The UE of claim 1, wherein the processor is configured to change the validity status of the portion of the available map data, from valid to invalid or from invalid to valid as appropriate, in response to determining that a consistency of the positioning information, the portion of the available map data, and the motion of the UE changed.

7. The UE of claim 1, wherein to determine whether the positioning information, the motion of the UE, and the portion of the available map data are consistent the processor is configured to:
 determine the portion of the available map data based on the positioning information; and
 determine whether the motion of the UE is consistent with a subset of the physical environmental features corresponding to the portion of the available map data.

8. The UE of claim 7, wherein to determine whether the motion of the UE is consistent with the subset of the physical environmental features corresponding to the portion of the available map data the processor is configured to determine whether the motion of the UE is less than a threshold amount of motion in a particular direction, the threshold amount of motion being based on the physical environmental features corresponding to the portion of the available map data.

9. The UE of claim 7, wherein to determine whether the motion of the UE is consistent with the subset of the physical environmental features corresponding to the portion of the available map data the processor is configured to determine whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

10. A user equipment (UE) comprising:
 means for sensing motion of the UE and producing output data indicative of the motion of the UE;
 means for obtaining positioning information based on positioning signals received by the UE;
 means for obtaining motion of the UE based on the sensor output data;
 means for obtaining available map data that includes locations of physical environmental features;
 means for selecting at least a portion of the available map data based on the motion of the UE;
 validity status means for determining a validity status of the portion of the available map data based on whether the positioning information, the motion of the UE, and the portion of the available map data are consistent, wherein the validity status means are for determining the validity status of the portion of the available map data as valid in response to the positioning information, the motion of the UE, and the portion of the available map data being consistent, and as invalid otherwise; and
 first determining means for determining at least one of a position estimate for the UE and a direction of motion of the UE constrained by the portion of the available map data based on the validity status of the portion of the available map data being valid and without being constrained by the portion of the available map data based on the validity status of the portion of the available map data being invalid.

11. The UE of claim 10, wherein the first determining means comprise means for determining, based on the portion of the available map data, based on the validity status of the portion of the available map data being valid, and based on one or more first respective positioning signal measurements, a first portion of the positioning information to use to determine the at least one of the position estimate for the UE or the direction of motion of the UE.

12. The UE of claim 11, wherein the first portion of the positioning information includes at least one of a pseudorange or a Doppler measurement.

13. The UE of claim 11, wherein the first determining means comprise means for disregarding a second portion of the positioning information, based on one or more second respective positioning signal measurements, that has a corresponding cross-track component above a threshold value.

14. The UE of claim 10, wherein the first determining means include means for determining the at least one of the position estimate for the UE or the direction of motion of the UE based on the map data only if the validity status of the portion of the available map data is valid.

15. The UE of claim 10, wherein the validity status means include means for changing the validity status of the portion of the available map data, from valid to invalid or from invalid to valid as appropriate, in response to determining that a consistency of the positioning information, the portion of the available map data, and the motion of the UE changed.

16. The UE of claim 10, wherein the validity status means comprise:
 second determining means for determining the portion of the available map data based on the positioning information; and
 third determining means for determining whether the motion of the UE is consistent with a subset of the physical environmental features corresponding to the portion of the available map data.

17. The UE of claim 16, wherein the third determining means comprise means for determining whether the motion of the UE is less than a threshold amount of motion in a particular direction, the threshold amount of motion being based on the physical environmental features corresponding to the portion of the available map data.

18. The UE of claim 16, wherein the third determining means comprise means for determining whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

19. A method, of determining position or motion, or both, of a user equipment (UE), the method comprising:
   obtaining motion information indicative of motion of the UE;
   obtaining positioning information based on positioning signals received by the UE;
   obtaining motion of the UE based on the sensor output data;
   obtaining available map data that includes locations of physical environmental features;
   selecting at least a portion of the available map data based on the motion of the UE;
   determining a validity status of the portion of the available map data based on whether the positioning information, the motion of the UE, and the portion of the available map data are consistent, wherein the validity status of the portion of the available map data is determined to be valid in response to the positioning information, the motion of the UE, and the portion of the available map data being consistent, and as invalid otherwise; and
   determining at least one of a position estimate for the UE and a direction of motion of the UE constrained by the portion of the available map data based on the validity status of the portion of the available map data being valid and without being constrained by the portion of the available map data based on the validity status of the portion of the available map data being invalid.

20. The method of claim 19, further comprising determining, based on the portion of the available map data, based on the validity status of the portion of the available map data being valid, and based on one or more first respective positioning signal measurements, a first portion of the positioning information to use to determine the at least one of the position estimate for the UE or the direction of motion of the UE.

21. The method of claim 20, wherein the first portion of the positioning information includes at least one of a pseudorange or a Doppler measurement.

22. The method of claim 20, wherein determining the at least one of the position estimate for the UE, or the direction of motion of the UE, comprises disregarding a second portion of the positioning information, based on one or more second respective positioning signal measurements, that has a corresponding cross-track component above a threshold value.

23. The method of claim 19, wherein determining the at least one of the position estimate for the UE, or the direction of motion of the UE, is based on the portion of the available map data only if the validity status of the portion of the available map data is valid.

24. The method of claim 19, further comprising changing the validity status of the portion of the available map data, from valid to invalid or from invalid to valid as appropriate, in response to determining that a consistency of the positioning information, the portion of the available map data, and the motion of the UE changed.

25. The method of claim 19, wherein determining whether the positioning information, the motion of the UE, and the portion of the available map data are consistent comprises:
   determining the portion of the available map data based on the positioning information; and
   determining whether the motion of the UE is consistent with a subset of the physical environmental features corresponding to the portion of the available map data.

26. The method of claim 25, wherein determining whether the motion of the UE is consistent with the subset of the physical environmental features corresponding to the portion of the available map data comprises determining whether the motion of the UE is less than a threshold amount of motion in a particular direction, the threshold amount of motion being based on the physical environmental features corresponding to the portion of the available map data.

27. The method of claim 25, wherein determining whether the motion of the UE is consistent with the subset of the physical environmental features corresponding to the portion of the available map data comprises determining whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

28. A non-transitory, processor-readable storage medium comprising processor-readable instructions configured to cause a processor of a user equipment (UE) to:
   obtain motion data indicative of motion of the UE;
   obtain positioning information based on positioning signals received by the UE;
   obtain motion of the UE based on the sensor output data;
   obtain available map data that includes locations of physical environmental features;
   select at least a portion of the available map data based on the motion of the UE;
   determine a validity status of the portion of the available map data based on whether the positioning information, the motion of the UE, and the portion of the available map data are consistent, wherein the instructions are configured to cause the processor to determine the validity status of the portion of the available map data as valid in response to the positioning information, the motion of the UE, and the portion of the available map data being consistent, and as invalid otherwise; and
   determine at least one of a position estimate for the UE and a direction of motion of the UE constrained by the portion of the available map data based on the validity status of the portion of the available map data being valid and without being constrained by the portion of the available map data based on the validity status of the portion of the available map data being invalid.

29. The storage medium of claim 28, further comprising instructions configured to cause the processor to determine, based on the portion of the available map data, based on the validity status of the portion of the available map data being valid, and based on one or more first respective positioning signal measurements, a first portion of the positioning information to use to determine the at least one of the position estimate for the UE or the direction of motion of the UE.

30. The storage medium of claim 29, wherein the first portion of the positioning information includes at least one of a pseudorange or a Doppler measurement.

31. The storage medium of claim 29, wherein the instructions configured to cause the processor to determine the at least one of the position estimate for the UE, or the direction of motion of the UE, comprise instructions configured to cause the processor to disregard a second portion of the positioning information, based on one or more second respective positioning signal measurements, that has a corresponding cross-track component above a threshold value.

32. The storage medium of claim 28, wherein the instructions configured to cause the processor to determine the at least one of the position estimate for the UE, or the direction of motion of the UE, comprise instructions configured to cause the processor to determine the at least one of the position estimate for the UE, or the direction of motion of the UE, based on the map data only if the validity status of the portion of the available map data is valid.

33. The storage medium of claim 28, wherein the instructions configured to cause the processor to determine the validity status of the portion of the available map data comprise instructions configured to cause the processor to change a status of the portion of the available map data, from valid to invalid or from invalid to valid as appropriate, in response to determining that a consistency of the positioning information, the portion of the available map data, and the motion of the UE changed.

34. The storage medium of claim 28, wherein the instructions configured to cause the processor to determine whether the positioning information, the motion of the UE, and the portion of the available map data are consistent comprise instructions configured to cause the processor to:
    determine the portion of the available map data based on the positioning in formation; and
    determine whether the motion of the UE is consistent with a subset of the physical environmental features corresponding to the portion of the available map data.

35. The storage medium of claim 34, wherein the instructions configured to cause the processor to determine whether the motion of the UE is consistent with the subset of the physical environmental features corresponding to the portion of the available map data comprise instructions configured to cause the processor to determine whether the motion of the UE is less than a threshold amount of motion in a particular direction, the threshold amount of motion being based on the physical environmental features corresponding to the portion of the available map data.

36. The storage medium of claim 34, wherein the instructions configured to cause the processor to determine whether the motion of the UE is consistent with the subset of the physical environmental features corresponding to the portion of the available map data comprise instructions configured to cause the processor to determine whether the motion of the UE indicates at least one of that the UE has exited a UE-acceptable area, that the UE has entered a UE-unacceptable area, that the UE is following a UE-acceptable trajectory, or that the UE has deviated from the UE-acceptable trajectory.

\* \* \* \* \*